US008825753B2

(12) United States Patent
Kaleem et al.

(10) Patent No.: US 8,825,753 B2
(45) Date of Patent: Sep. 2, 2014

(54) METHODS AND SYSTEMS TO PROVIDE DYNAMIC CONTENT AND DEVICE PANEL MANAGEMENT

(75) Inventors: Farook Kaleem, Piscataway, NJ (US); Jeffrey T. Menniti, Nutley, NJ (US); Jesus Ramos, Easton, PA (US)

(73) Assignee: Cellco Partnership, Basking Ridge, NJ (US)

( * ) Notice: Subject to any disclaimer, the term of this patent is extended or adjusted under 35 U.S.C. 154(b) by 6 days.

(21) Appl. No.: 13/523,783

(22) Filed: Jun. 14, 2012

(65) Prior Publication Data
US 2013/0339422 A1    Dec. 19, 2013

(51) Int. Cl.
*G06F 15/16*    (2006.01)

(52) U.S. Cl.
USPC ......................................................... 709/203

(58) Field of Classification Search
USPC ......................................................... 709/203
See application file for complete search history.

(56) References Cited

U.S. PATENT DOCUMENTS

| 5,535,407 | A * | 7/1996 | Yanagawa et al. ............. 705/39 |
| 7,349,884 | B1 * | 3/2008 | Odom et al. .................... 705/40 |
| 7,853,474 | B2 * | 12/2010 | Ullah ........................... 705/7.31 |
| 8,145,234 | B1 * | 3/2012 | Leonard et al. ............ 455/456.1 |
| 8,290,433 | B2 * | 10/2012 | Fisher et al. ................. 455/41.1 |
| 8,307,283 | B1 * | 11/2012 | O'Neill ......................... 715/709 |
| 8,408,457 | B2 * | 4/2013 | Overhultz et al. ............ 235/383 |
| 2002/0066621 | A1 * | 6/2002 | Wilson et al. ................ 187/391 |
| 2002/0156858 | A1 * | 10/2002 | Hunter ......................... 709/207 |
| 2003/0018613 | A1 * | 1/2003 | Oytac ............................ 707/1 |
| 2003/0105667 | A1 * | 6/2003 | Millikan ....................... 705/14 |
| 2004/0243472 | A1 * | 12/2004 | Vadjinia ......................... 705/15 |
| 2005/0108707 | A1 * | 5/2005 | Taylor et al. .................. 717/177 |
| 2006/0180664 | A1 * | 8/2006 | Barrett et al. ................. 235/383 |
| 2008/0071881 | A1 * | 3/2008 | Kronlund et al. ............. 709/217 |
| 2008/0104121 | A1 * | 5/2008 | Gottlieb et al. ............ 707/104.1 |
| 2008/0126142 | A1 * | 5/2008 | Campellone ..................... 705/5 |
| 2008/0320463 | A1 * | 12/2008 | Peterson et al. ............. 717/168 |
| 2009/0164287 | A1 * | 6/2009 | Kies et al. ........................ 705/8 |
| 2009/0182700 | A1 * | 7/2009 | Hodges ........................... 706/54 |
| 2010/0179885 | A1 * | 7/2010 | Fiorentino ..................... 705/27 |
| 2010/0241507 | A1 * | 9/2010 | Quinn et al. ............... 705/14.42 |
| 2010/0291909 | A1 * | 11/2010 | Nagaraja ....................... 455/415 |
| 2011/0071884 | A1 * | 3/2011 | Michaelis et al. ............. 705/10 |
| 2011/0071894 | A1 * | 3/2011 | Nesamoney et al. ...... 705/14.25 |
| 2011/0072132 | A1 * | 3/2011 | Shafer et al. .................. 709/224 |

(Continued)

OTHER PUBLICATIONS

Strohbach, M.; Martin, M., "Toward a Platform for Pervasive Display Applications in Retail Environments," Apr.-Jun. 2011, Pervasive Computing, IEEE , vol. 10, No. 2, pp. 19-27.*

*Primary Examiner* — Eleni Shiferaw
*Assistant Examiner* — Nelson Giddins

(57) ABSTRACT

Systems and methods are disclosed that provide for automatic management of device content for demonstration applications running on mobile devices such as smart phones. The systems and methods can eliminate or reduce the need for manual process of content management for such demonstration applications. Systems and methods according to the present disclosure can also provide for the following: updating content on a device to include content that demonstrates the device capabilities dynamically; delivering content based on the device demographic to cater the needs of the customers; performing local wipe of content generated by customers at regular intervals automatically; providing easy discovery of the premium device capabilities to the customers; advertising new capabilities delivered to the devices; and, tracking features/applications used by the customers and/or creating a store or device profile.

20 Claims, 4 Drawing Sheets

(56) References Cited

U.S. PATENT DOCUMENTS

| | | | |
|---|---|---|---|
| 2011/0119132 A1* | 5/2011 | Morton et al. | 705/14.53 |
| 2011/0145073 A1* | 6/2011 | Richman et al. | 705/14.66 |
| 2011/0178863 A1* | 7/2011 | Daigle | 705/14.31 |
| 2011/0258252 A1* | 10/2011 | Torres Ramon et al. | 709/203 |
| 2011/0270618 A1* | 11/2011 | Banerjee et al. | 705/1.1 |
| 2012/0088487 A1* | 4/2012 | Khan | 455/418 |
| 2012/0094639 A1* | 4/2012 | Carlson et al. | 455/414.1 |
| 2012/0116929 A1* | 5/2012 | Gventer et al. | 705/28 |
| 2012/0149325 A1* | 6/2012 | Titus et al. | 455/404.2 |
| 2012/0149352 A1* | 6/2012 | Backholm et al. | 455/418 |
| 2012/0209781 A1* | 8/2012 | Michaelis et al. | 705/304 |
| 2012/0296782 A1* | 11/2012 | Tsai et al. | 705/28 |
| 2012/0324440 A1* | 12/2012 | Greenbaum | 717/177 |
| 2013/0073400 A1* | 3/2013 | Heath | 705/14.73 |
| 2013/0073431 A1* | 3/2013 | Suro et al. | 705/26.61 |
| 2013/0104203 A1* | 4/2013 | Davis et al. | 726/5 |
| 2013/0124283 A1* | 5/2013 | Kaulbach | 705/14.22 |
| 2013/0197968 A1* | 8/2013 | Davis et al. | 705/7.29 |
| 2013/0268316 A1* | 10/2013 | Moock et al. | 705/7.29 |

* cited by examiner

Fig. 3

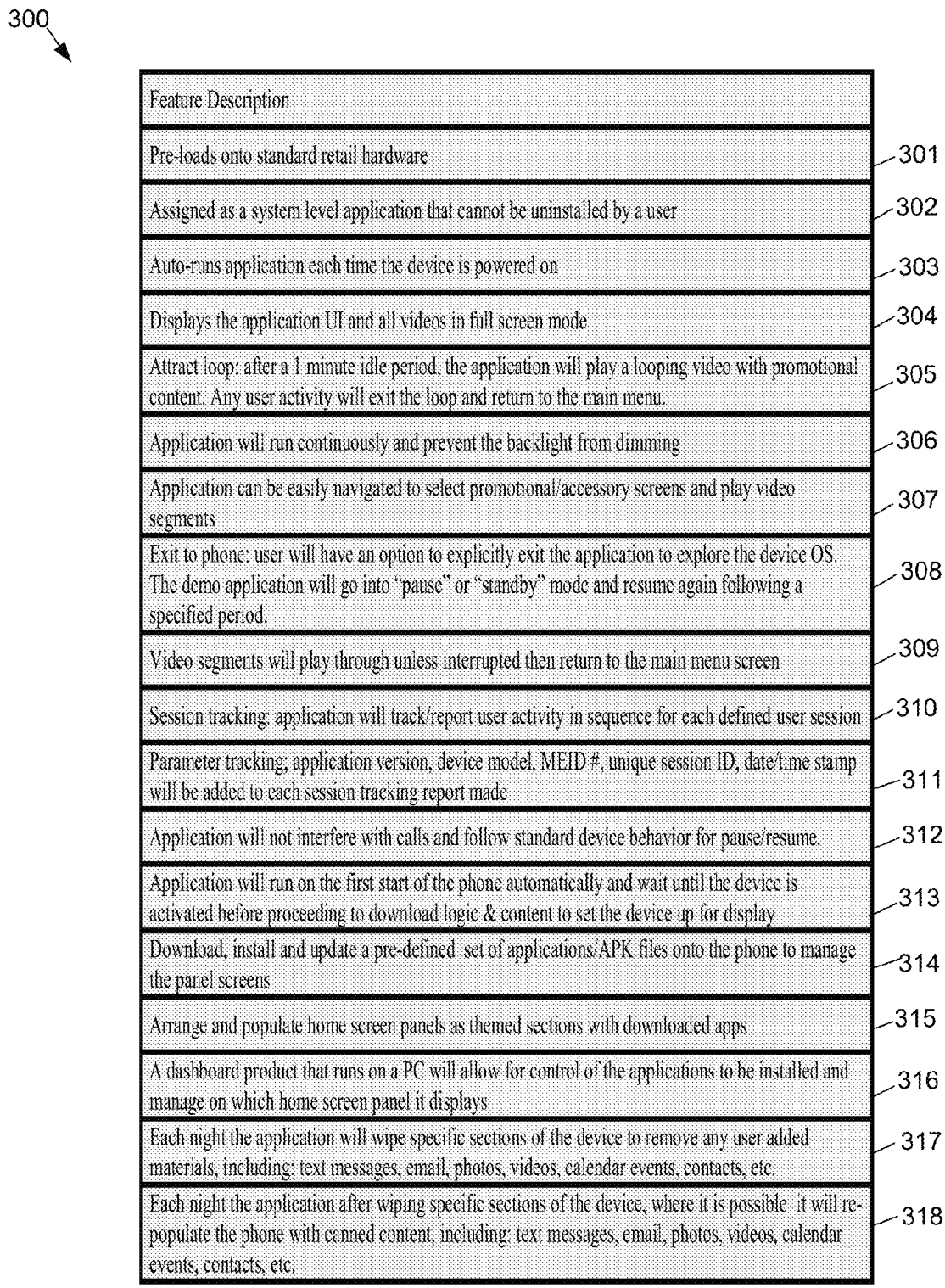

| Feature Description | |
|---|---|
| Pre-loads onto standard retail hardware | 301 |
| Assigned as a system level application that cannot be uninstalled by a user | 302 |
| Auto-runs application each time the device is powered on | 303 |
| Displays the application UI and all videos in full screen mode | 304 |
| Attract loop: after a 1 minute idle period, the application will play a looping video with promotional content. Any user activity will exit the loop and return to the main menu. | 305 |
| Application will run continuously and prevent the backlight from dimming | 306 |
| Application can be easily navigated to select promotional/accessory screens and play video segments | 307 |
| Exit to phone: user will have an option to explicitly exit the application to explore the device OS. The demo application will go into "pause" or "standby" mode and resume again following a specified period. | 308 |
| Video segments will play through unless interrupted then return to the main menu screen | 309 |
| Session tracking: application will track/report user activity in sequence for each defined user session | 310 |
| Parameter tracking: application version, device model, MEID #, unique session ID, date/time stamp will be added to each session tracking report made | 311 |
| Application will not interfere with calls and follow standard device behavior for pause/resume. | 312 |
| Application will run on the first start of the phone automatically and wait until the device is activated before proceeding to download logic & content to set the device up for display | 313 |
| Download, install and update a pre-defined set of applications/APK files onto the phone to manage the panel screens | 314 |
| Arrange and populate home screen panels as themed sections with downloaded apps | 315 |
| A dashboard product that runs on a PC will allow for control of the applications to be installed and manage on which home screen panel it displays | 316 |
| Each night the application will wipe specific sections of the device to remove any user added materials, including: text messages, email, photos, videos, calendar events, contacts, etc. | 317 |
| Each night the application after wiping specific sections of the device, where it is possible it will re-populate the phone with canned content, including: text messages, email, photos, videos, calendar events, contacts, etc. | 318 |

METHODS AND SYSTEMS TO PROVIDE DYNAMIC CONTENT AND DEVICE PANEL MANAGEMENT

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology.

One result of the increase in popularity and capability of wireless devices is that they have become increasingly complex, with more and more features being presented to consumers. Such complexity has presented difficulties when sales people, or point of sale (POS) representatives, are put in a sales situation with prospective buyers with only a limited amount of time available to entice the buyer into a sale.

Currently mobile devices shipped to stores typically provide manual methods and processes for the POS representatives to configure content on a device used for demonstrating device capability. The POS representatives are required to configure each utility or application on the device manually, with each utility typically connecting to a backend server to download promotional content. The utilities and content downloaded by the POS representatives are typically demonstrated to customers to highlight the features and functionality of the device, which can help the customers to make purchase decisions. Each device so used may have its own utilities or applications and may need to be configured differently. In addition, when new utilities or applications come out or old utilities or applications are updated, the POS representatives may need to be informed about and install these onto each device, a manually intensive process that may also need to be timely addressed.

While using the device features, the customers may often create media content such as pictures, videos, text messages, contacts, etc. The content created by the customers stays on the device, unless the POS representatives manually remove the content at regular intervals. Some such customer-created content as created by one particular customer may be contain private information or may be offensive to other customers. To avoid these type of issues, the POS representatives typically are obliged to perform a manual clean up process for this type of content generated by the customers on the device, which is labor-intensive and time consuming. In some cases, however, the POS representatives may forget to wipe the generated content for one or more days.

It would thus be beneficial to provide an automated method for modifying content, including updating revised or new content or wiping user-generated content, to devices to be used for demonstration purposes.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 3 illustrates a table of features available from an exemplary preloaded demonstration application running on a mobile device, in accordance with the present disclosure.

Figure 1:
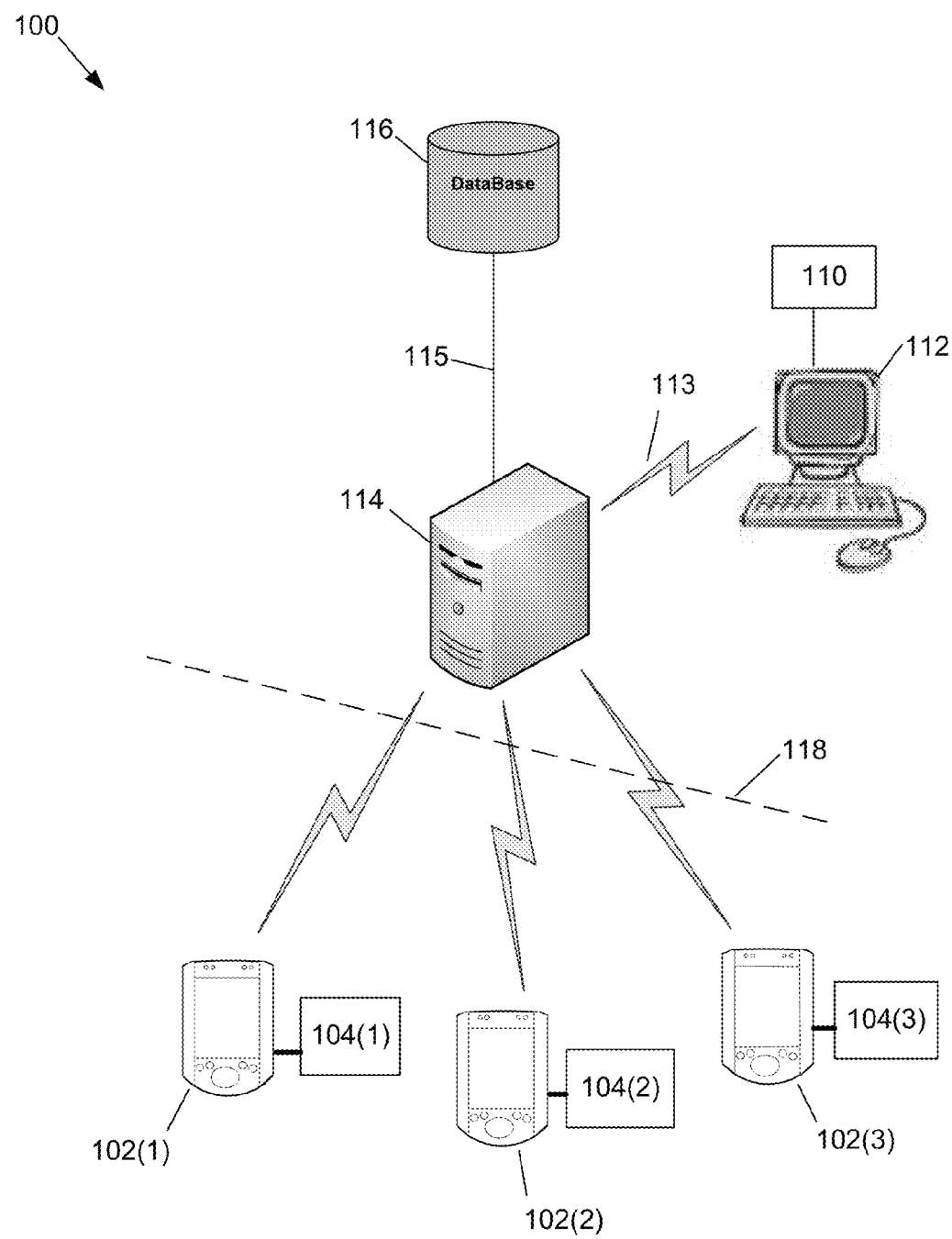
FIG. 1 illustrates an example of a system to provide dynamic content and device panel management to preloaded applications on mobile devices, in accordance with the present disclosure.

While certain embodiments and aspects of the subject technology are depicted in the drawings, one skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable dynamic content and device panel management for mobile stations, also referred to as mobile devices, such as smart phones in a point of sale (POS) environment. Systems and methods according to the present disclosure can be utilized to provide content management automatically. Systems and/or methods as described herein can further be utilized for updating content on a wireless device remotely using a tool or utility (or, software application), e.g., available from an enterprise network provider.

As device configuration can vary from store to store or from one geographic region to another to cater the needs of local demographics, systems, utilities, and methods according to the present disclosure can provide dynamic content management for mobile devices. Such functionality can increase awareness of the device capabilities and advertise key services offered on the devices, which can help customers discover the device capability and make purchase decisions in any store in any geographic location.

Systems and methods according to the present disclosure can automatically manage device content for demonstration applications running on mobile devices. Such systems and methods can eliminate or reduce the need for a manual process of content management. Systems and methods according to the present disclosure can also provide for the following: updating content on a device to include content that demonstrates the device capabilities dynamically; delivering content based on the device demographic to cater the needs of the customers; performing local wipe of content generated by customers at regular intervals automatically; providing easy discovery of the premium device capabilities to the customers; advertising new capabilities delivered to the devices; and, tracking features/applications used by the customers and/or creating a store or device profile.

In one aspect, systems and methods according to the present disclosure can provide for management and/or configuration of interactive media and application (e.g., promotional videos, supported applications, etc.) of such mobile devices displayed in stores; such interactive media and applications provide information helpful for customers to discover the device capabilities and make decisions on purchasing mobile devices such as smart phones.

FIG. 1 illustrates an example of a system 100 for providing dynamic content and device panel management for mobile devices having demonstration applications, in accordance with the present disclosure. Separate mobile devices 102(1)-102(3) are shown. Of course while three such devices are indicated in the drawing, any number of mobile devices may be present. Each mobile device 102(1)-102(3) includes a preloaded demonstration (or "demo") application, 104(1)-104(3), respectively, that provides selected content and media for the mobile devices 102(1)-102(3). Each preloaded application 104(1)-104(3) can be configured or managed to present various selected content and media to users, such as, prospective buyers in a store setting.

A content management application 110 can be present and can be used to provide or manage content, e.g., store-specific content, for each preloaded application 104(1)-104(3). The content management application 110 can be accessed through a user interface device 112, such as one included with a personal computer, personal digital assistant, or the like. A content server 114 can store content for delivery to the mobile devices 102(1)-102(3). The content management application 110 and user interface device 112 may be connected or configured to connect to the content server 114 by a suitable communications link 113, which may be wireless or wired. A database 116 may also be present, and may operate to keep information/data about use of content on the mobile devices 102(1)-102(3) as provided/managed by the preloaded applications 104(1)-104(3) and/or use of such devices. The database 116 may be connected to or configured to connect to the content server 114 by a suitable communications link 115, which may be wireless or wired. For downloading desired content to the preloaded applications 104(1)-104(3) or the preloaded application 104(1)-104(3) themselves, a communications link or interface 118 can be established as shown. The communications link or interface 118 can also support the transfer of information/data from the preloaded applications 104(1)-104(3) on the mobile devices 102(1)-102(3) to the content server 114, the database 116 and/or the content management application 110. The communications interface 118 can be wireless or wired.

Figure 2:
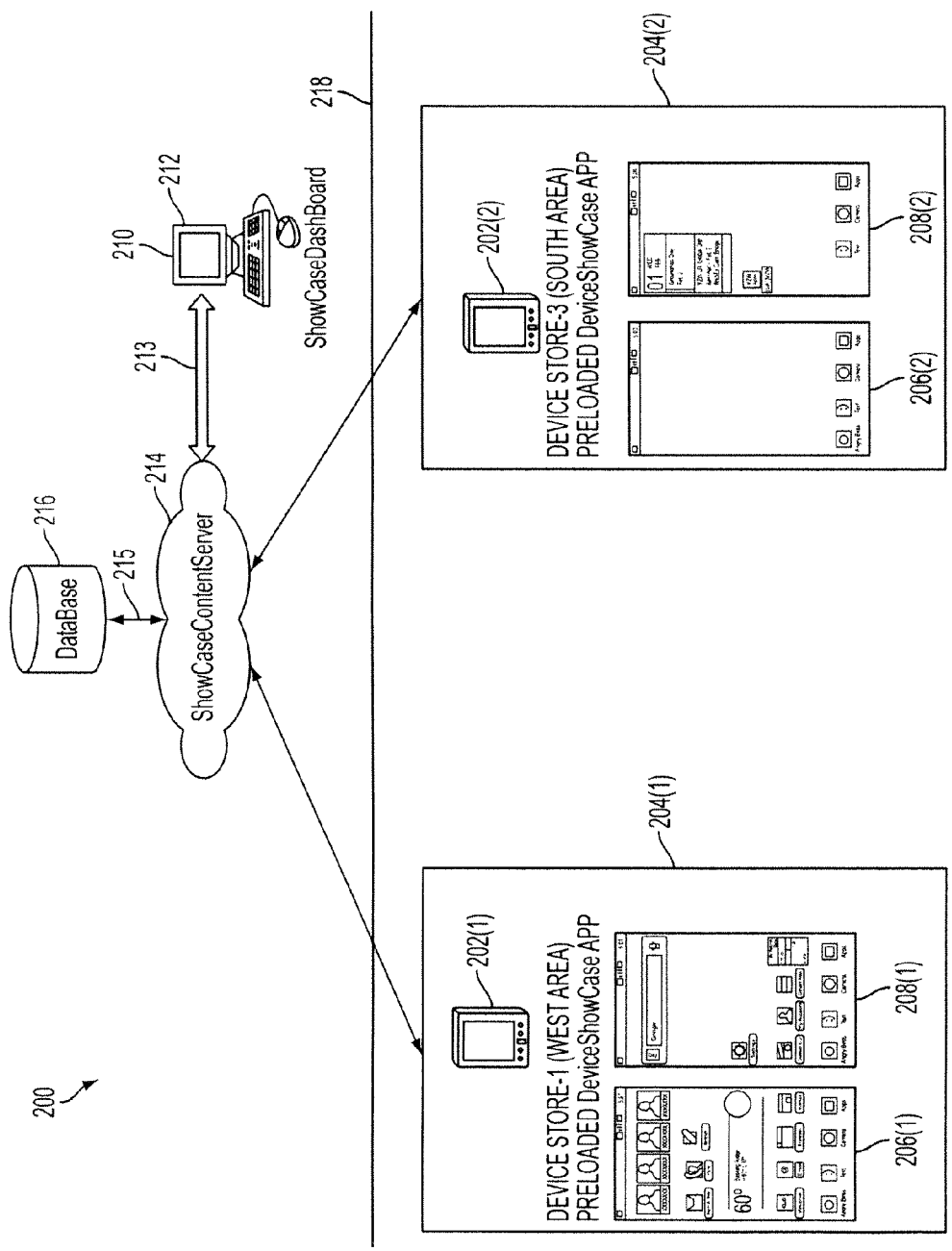
FIG. 2 shows a system similar to that of FIG. 1, with two mobile devices showing multiple representative user display screens configured for different stores in different geographic locals, in accordance with the present disclosure.

FIG. 2 shows a system 200 similar to that of FIG. 1, with two mobile devices 202(1)-202(2), each managed by a preloaded demonstration (or "demo") application, 204(1)-204(2), respectively, in accordance with the present disclosure. System 200 can be used to provide dynamic content and device panel management for mobile devices on display in a POS environment, in accordance with the present disclosure. As indicated by the different representative user display screens for the mobile devices 202(1)-202(2), the demonstration applications 204(1)-204(2) can be configured differently, e.g., to receive and/or display store-specific content for different stores in different geographic locals. As further indicated, the mobile devices 202(1) and 202(2) can each be located in stores at different geographic locations. Each preloaded application 204(1)-204(2) can be managed, e.g., according to commands provided by an administrator, to present various desired screens 206(1)-206(2) and 208(1)-208(2), respectively, to users such as prospective buyers. Different demographics can accordingly be addressed by marketing that include different content, e.g., store-specific content, for different stores/locations.

Continuing with the description of system 200, a content management application 210 can be present and used to provide or manage content for each preloaded application 204(1)-204(2). The content management application 210 can be accessed or be accessible through a user interface device 212, such as one included or used with a personal computer, personal digital assistant, smart phone, other mobile device, or the like. A content server 214 can store content for delivery to the mobile devices 202(1)-202(2). The content management application 210 and user interface device 212 may be connected or configured to connect to the content server 214 by a suitable communications link 213, which may be wireless or wired. A database 216 may also be present, and may operate to keep information/data about use of content on the mobile devices 202(1)-202(2) as provided/managed by the preloaded applications 204(1)-204(2) and/or use of such devices. The database 216 may be connected to or configured to connect to the content server 214 by a suitable communications link 215, which may be wireless or wired. For downloading desired content (e.g., store-specific content) to the preloaded applications 204(1)-204(2) or the preloaded application 204(1)-204(2) themselves, a communications link or interface 218 can be established as shown. The communications link or interface 218 can also support the transfer of information/data from the preloaded applications 204(1)-204(2) on the mobile devices 202(1)-202(2) to the content server 214, the database 216 and/or the content management application 210. The communications interface 218 can be wireless or wired. The store-specific content and/or a configuration of a preloaded demo application can be updated or revised as desired. For example, store-specific content and/or a configuration of a preloaded demo application can be updated or revised while a mobile device is at a designated store, at a designated time (e.g., after store hours such as 2 am or whenever users are unlikely to be accessing the device), and/or in response to a tracking report of use of a preloaded application 204(1)-204(2) and mobile device 202(1)-202(2), as described in further detail below.

FIG. 3 is a table 300 listing features provided by exemplary embodiments of the subject technology as described herein. The features shown can be implemented by exemplary systems, e.g., system 200 of FIG. 2, so as to provide dynamic content and device panel management utilizing preloaded demonstration applications running on mobile devices for display in a POS environment.

As described at 301, a preloaded demonstration application (e.g., a "DeviceShowCase" such as 204(1) in FIG. 2) can be loaded onto standard retail hardware such as various smart phones (e.g., a "Droid" or other phones utilizing the Android operating system, etc.). The preloaded application can be assigned as a system level application that cannot be removed by a user, e.g., as described at 302. The device can automatically run the preloaded application each time the device is powered on, e.g., as described at 303. The device can display the preloaded application user interface (UI) and any related videos at a desired screen size (e.g., in full screen mode), as described at 304. The device with the preloaded application can be set up on a so-called "attract loop" in which after a designated period (e.g., 1 minute) of being idle, the application can play a looping video with promotional content, as described at 305; any user activity may cause the application to exit from the loop, e.g., to return to a main menu. Further, as these devices may usually be continually charging (e.g., plugged into a wall jack, near an inductive charger, etc) at the enterprise where they are being displayed, the preloaded application can run continuously and prevent the device's screen backlighting from dimming, as described at 306.

Continuing with the description of table 300, the preloaded application can be designed to be easily navigated by a user, e.g., by presenting screens on the device display that have a few large icons for easy selection of promotional/accessory screens and/or playing demonstration video segments, e.g., graphics-intensive videos that highlight the graphics capabilities of the device, as described at 307. The preloaded application can provide the user with an option to explicitly exit the application in order to explore the features of the device operating system (OS), e.g., to explore the functionality of the phone, as described at 308; the preloaded application can at this point go into a pause or standby mode and resume normal operation again following a specified period (e.g., 2 minutes, etc.) of no user activity. During operation of the preloaded application, any video segments selected by the preloaded application may play through to the end, unless interrupted, and then return to the main screen, as described at 309.

The preloaded application can also provide for tracking or monitoring of the activity of each user for the device, e.g., in a tracking report, as described at 310; such tracking can be provided to a server and database, e.g., as described for system 100 of FIG. 1. Desired data, including desired parameters, can be added to a tracking report. For example, a tracking report may include, but is not limited to, any one or more of the following parameters: an application version, a device model, a mobile equipment identifier (MEID #), a unique session ID, and/or a date/time stamp for a particular session of use, as described at 311; other data may of course be included in a tracking report. The preloaded application in exemplary embodiments will not interfere with calls to the phone and may follow standard device behavior for pause/resume, as described at 312.

Continuing further with the description of table 300, the preloaded application can be configured to run automatically run when the phone is first powered up and can wait until the device is activated before proceeding to download logic and content to set the device up for display, e.g., in a POS environment at a store in a particular geographic region, as described at 313. The preloaded application can download, install, and update a pre-defined set of applications or files (e.g., Android application package files, or "APK" files) onto the device to manage the screen views, also referred to as panel screens, visible to a user on the device display, as described at 314. The preloaded application can further arrange and populate home screen panels as themed sections with download applications, as described at 215. A content management application (e.g., 210 of FIG. 2) can allow for control of the applications and content to be installed on a particular device can designate or configure the home screen panel(s) displayed on the device, as described at 316. At designated times (e.g., at a specified time each night as defined locally [e.g., 2 am] or globally [e.g., 2 am EST]), the preloaded application can wipe or erase specific sections of the device to remove any user added content/materials, including, but not limited to, text messages, email photos, videos, calendar events, contacts, etc., as described at 317. The preloaded application may determine that content is user added content by determining the time content was added or by a comparison to a log of default content. After such wiping/erasing procedures, the preloaded application, when desired, may repopulate the phone with predetermined content including, but not limited to, text messages, email photos, videos, calendar events, contacts, etc., as described at 318.

In exemplary embodiments, following a successful download or update of the preloaded demo application, as well as on a daily/weekly basis, the home screen of the device can be refreshed to reflect the most current suite of applications and to remove any user-installed icons and to put the home screen panels into a default state. The preloaded application can determine from the associated server (e.g., content server 214 of FIG. 2) what the defined default settings are for a particular device, e.g., as indentified by the MEID. The default settings can include, but are not limited to any of the following: background/wallpaper graphic; number of panels; position/number of the middle/default/home panel(s); and, application icons to be placed on each panel. The preloaded application can also perform the following functions: refresh the home screen and panels to their system default state: set number of panels to be a desired number; set home panel position; set wallpaper graphic to default; set placed icons to default/remove any non-default icons; and place icons for the downloaded/provisioned applications on the specified panel.

As noted above, a preloaded demo application can provide for or facilitate tracking of the use of the device. For such tracking, a store identification (ID) parameter can be used to identify exactly in which store the device is located. For some applications, the store ID can be preloaded, e.g., supplied with the preloaded application. In other applications, the store ID can be supplied after the preloaded application is provided to a device, e.g., in the store environment by a sales representative. In various embodiments, the store ID can be stored locally on the device and/or in a server that provides the service (or is accessible to the server that provides the service) to the device so that the server can match the device ID (e.g., MEID) with the store (store ID). If stored locally, the store ID may be transmitted, e.g., when requested by the server. The transmitted store ID may be used by the server to confirm the location of the device with that stored in the server. Location techniques may be used additionally or instead to confirm that the store ID stored in the server is correct—e.g., the GPS location of the device is obtained by the server and matched with the address of a particular store. If the location of the store and the store ID do not match, the store ID is then updated to match that of a store at the geographical location. Along with the store ID, which may be initially assigned by an administrator prior to the preloaded application being provided to the device, the users' interest in specific application categories can be tracked and reported to the backend (e.g., server 214 and database 216 of FIG. 2), which is under control of the carrier. Alternately, the backend may store a list of which device has been shipped to which store and use the device ID to lookup this information. In another embodiment, GPS or another location-based technique may be used to determine the store.

This information may be used to modify what is loaded onto the device when the device is updated. This is to say that, in some embodiments, the device captures applications used, websites visited, and other user-related (non-personal) information over a predetermined amount of time (e.g., since the last update/wipe) and provides this information to the backend. The backend can then analyze (e.g., automatically or as facilitated by an administrator) the user-related information over the same or a different time period (e.g., longer—such as a week), and can adjust what is being loaded onto each device accordingly. In some instances, the backend (e.g., automatically or as facilitated by an administrator) may cross-correlate user-related information for all devices within the store and/or within a predetermined distance from the store to adjust the upload. The predetermined distance may vary by geographical location such that the content for all devices in a town may be similar while in a city may vary from neighborhood to neighborhood. The changes to the device (and other devices within the store and/or nearby stores) may also vary from device to device as certain content may not be available for particular devices. In this case, similar content may be provided.

For some applications, in addition to user-related information or carrier-dependent information defining the content placed on the store device, premium content can be placed on the panels of the preloaded demo application, e.g., for lead application developers. For example, an enterprise network provider (e.g., Verizon Wireless) can work with lead application/content developers to promote the placement of their content on one or more screen panels (e.g., the start-up or the home panel) presented to a user by the preloaded application at an agreed price. The content may stay for an agreed upon time, and after the expiry of the terms the content can be removed/updated dynamically.

Figure 4:
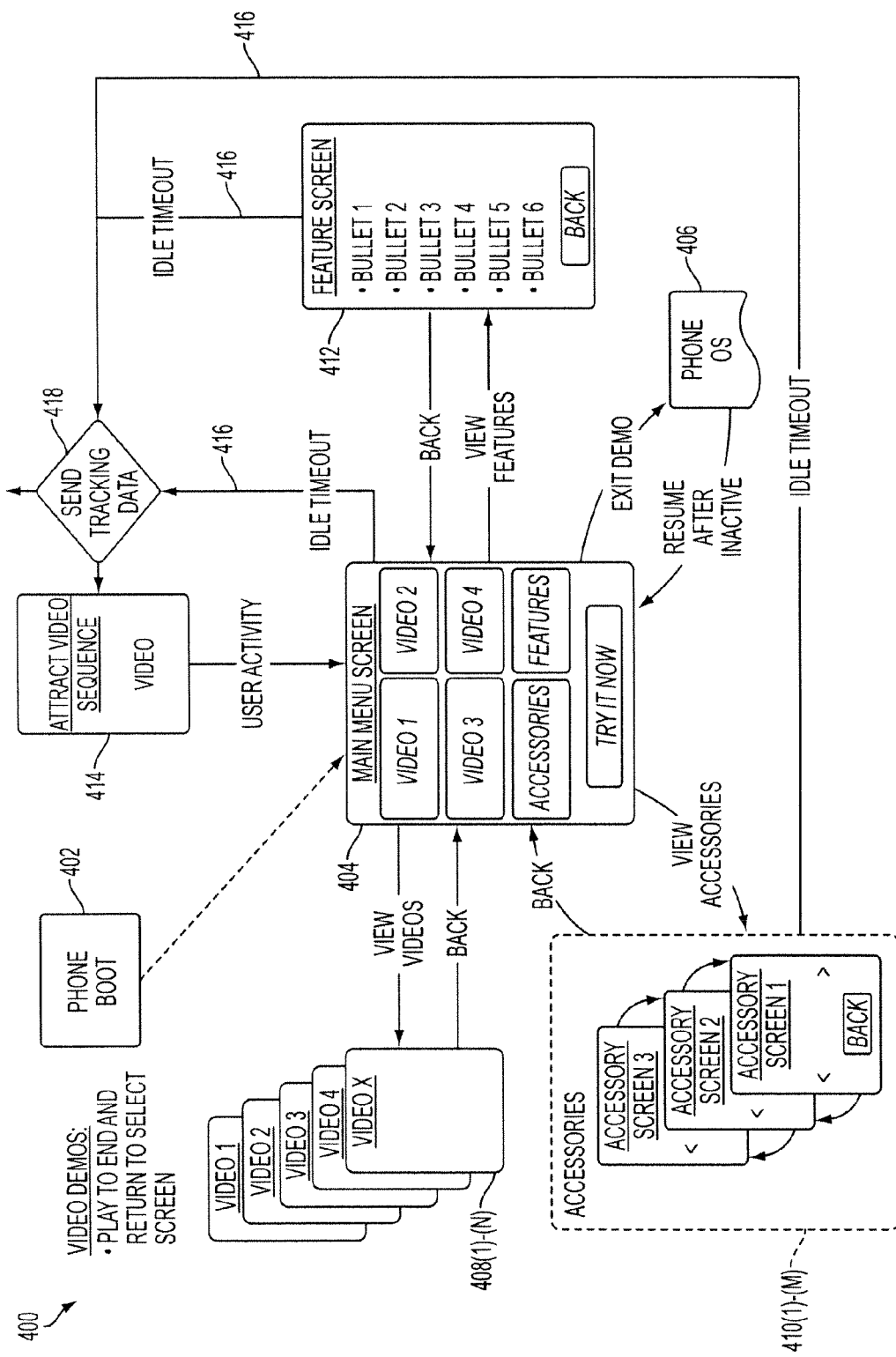
FIG. 4 illustrates an example of operation and corresponding screen views from a preloaded demonstration application running on a mobile device, in accordance with the present disclosure.

FIG. 4 illustrates an example 400 of operation and corresponding screen views (or "panels") of a preloaded demonstration ("demo") application running on a mobile device for providing desired content, e.g., store-specific content, to a user, in accordance with the present disclosure. Of course, the screens shown represent examples only; each mobile device running a preloaded demo application may actually have a specific set of videos and navigable screens with content placement, and such may vary, e.g., as described above or as otherwise specified by an administrator.

In operation, the mobile device can be configured with the preloaded demo application so that when the mobile device is first activated, indicated by phone boot 402, a main menu screen 404 is presented for users, e.g., prospective buyers in a store. An operating system 406 is included for the mobile device, and can be accessed as an option by a user. From the operating system 406, a user can access the preloaded demo application directly, or it can be returned to automatically after a specified period of inactivity, as indicated.

The main menu screen 404 presents a number of options for a user to select and explore the functionality of the mobile device. For example, main menu screen 404 can be configured to allow a user to selected and play a number (N) of video demonstration segments or clips, e.g., as shown by 408(1)-408(N). Such video demonstrations can be provided to the demo application running on the mobile device, e.g., by an administrator using a content management application 110 as shown and described for FIG. 1. Once a video has ended or is stopped, a user may be redirected back to the main menu screen 404, as indicated.

The main menu screen 404 provided by the preloaded demo application may also present a number (N) of options for a user to select and view a number of accessory screens, e.g., as shown by 410(1)-410(N). Such accessory screens can include ones to select options available for configuration of the device, e.g., alarm loudness or entering silent mode, or for using various features of the device such as a camera for taking still photographs or video, etc. Once finished with the accessory screen(s), a user may be redirected back to the main menu screen 404, as indicated.

The main menu screen 404 provided by the preloaded demo application may also present a feature screen 412 highlighting various features of the device, as shown. Such features may be listed on the feature screen 412, or may be described on more or more subsequent features screens (not shown). Once finished with the feature screen(s), a user may be redirected back to the main menu screen 404, as indicated.

The preloaded demo application can also present one or more demonstration videos 412 designed to attract users after the device has been in a period of inactivity (e.g., a so-called "attract" video sequence) 414. For example, the preloaded demo application may be configured to play such a demonstration video 412 after the device has presented one of the previously described screens (404, 410, and/or 414) for a specified period of inactivity (e.g., three minutes) as indicated by idle timeout 416.

Also, the preloaded demo application can send tracking data, e.g., in the form of a tracking report, to a content server and/or related database (e.g., content server 114 and database 116 in FIG. 1), as indicated at 418. Such a tracking report may contain various data including, but not limited to, any of the following parameters: an application version, a device model, a mobile equipment identifier (MEID #), a unique session ID, and/or a date/time stamp for a particular session of use.

As was described previously, the store-specific content and/or a configuration of the preloaded demo application can be updated or revised as desired. For example, store-specific content and/or a configuration of a preloaded demo application can be updated or revised while a mobile device is at a designated store, at a designated time (e.g., at the end of the day), and/or in response to a tracking report of use of a preloaded application and mobile device. In addition user added content can similarly be removed. Content added by a user can be removed when the related device is brought to a particular store, e.g. a new store at a new location, or at a particular time (e.g., 2 am locally). Note that store-specific content and/or configuration of the preloaded demo application can be different than that for devices in other stores, although such store-specific content may be the same as the store-specific content sent to one or more other stores (as above, generally in the same area). Moreover preloaded demonstration applications running on mobile devices at different stores in different geographic locations may be configured, e.g., by user of content managament application 210 of FIG. 2, to present different store-specific content to users in stores at different locations. For example, even though two preloaded demonstration applications, each on a separate mobile device at a respective store in a different location, might contain the same or similar store-specific content, the preloaded demonstration applications may each be configured differently, such that they display different content in the different stores. This can facilitate or further facilitate differentiating content/displays based on geographic region.

Those skilled in the art presumably are familiar with the structure, programming and operations of the various types of mobile stations. For completeness, however, the following is provided as a high-level discussion of functional elements/aspects of exemplary mobile stations. For purposes of such a discussion, a mobile station can include reference to a smartphone or may be incorporated into another device, such as a personal digital assistant (PDA) or the like. A handset embodiment of a mobile station functions as a normal digital wireless telephone station. For that function, the station includes a microphone for audio signal input and a speaker or audio signal output. The microphone and speaker connect to voice coding and decoding circuitry (vocoder). For a voice telephone call, for example, the vocoder provides two-way conversion between analog audio signals representing speech or other audio and digital samples at a compressed bit rate compatible with the digital protocol of wireless telephone network communications or voice over packet (Internet Protocol) communications. For digital wireless communications, the handset also includes at least one digital transceiver (XCVR). Today, the handset would be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology. The transceiver provides two-way wireless communication of information, such as vocoded speech samples and/or digital information, in accordance with the technology of one or more related networks. The transceiver also sends and receives a variety of signaling messages in support of the various voice and data services provided via the mobile station and the communication network. Each transceiver connects through RF send and receive amplifiers (not separately shown) to an antenna. The transceiver may also support various types of mobile messaging services, such as short message service (SMS), enhanced messaging service (EMS) and/or multimedia messaging service (MMS).

The mobile station includes a display for displaying messages, menus or the like, call related information dialed by the user, calling party numbers, etc. A keypad and/or touch-screen enables dialing digits for voice and/or data calls as well as generating selection inputs, for example, as may be keyed-in by the user based on a displayed menu or as a cursor control and selection of a highlighted item on a displayed screen. The display and touch-screen or keypad are the physical elements providing a textual or graphical user interface. Various combinations of the touch-screen, keypad, display, microphone and speaker may be used as the physical input output elements of the graphical user interface (GUI), for multimedia (e.g., audio and/or video) communications. Of course other user interface elements may be used, such as a trackball, as in some types of PDAs or smart phones.

In some applications, a general purpose computer configured as a server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to provide content management for preloaded demonstration applications on mobile devices, e.g., mobile devices 102(1)-102(3) in FIG. 1, so as to function as a server, e.g., content server 114 in FIG. 1.

A user terminal such as a general-purpose personal computer or a mobile device typically includes a central processor or other processing device, an internal communication bus, various types of memory or storage media (e.g., RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to process the instructions received from the network. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to perform functions of receiving instructions for content management, in essentially the manner performed in the implementations discussed and illustrated herein.

Hence, aspects of the methods of content management as outlined above may be embodied in programming or, "program aspects." Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for providing automatic content management to a preloaded demonstration application on a mobile device in a store, the system comprising:
    a communications interface for communications between a mobile device and a content server associated with the mobile device, the interface configured to provide store-specific content to the mobile device over a communication session established between the mobile device and the content server;
    a processor coupled to the interface;
    a storage device accessible to the processor; and
    programming for execution by the processor, stored in the storage device, wherein execution of the programming by the processor configures the system to perform functions, including functions to:
    remove content added by a user;
    deliver store-specific content from the content server to a preloaded demonstration application running on the mobile device;
    configure the preloaded demonstration application to present desired store-specific content to a user;
    prepare a tracking report with data gathered as a result of user navigation through various functions of the mobile device and applications stored on the mobile device within a specific store;
    determine whether the mobile device is in a predetermined store using a mobile equipment identifier for the mobile device, a store identification associated with the predetermined store in which the mobile device is intended to be located, and global positioning system coordinates of the mobile device;
    in response to a determination that the global positioning system coordinates of the predetermined store in which the mobile device is intended to be located are different from the global positioning system coordinates of the mobile device, replace the store identification associated with the predetermined store in which the mobile device is intended to be located with a store identification associated with a store at the global positioning system coordinates of the mobile device; and
    update the configuration of the preloaded demonstration application on the mobile device based on information included in the tracking report and the replaced store identification.

2. The system of claim 1, wherein execution of the programming by the processor configures the system to remove the content added by the user after store hours, and wherein the removed content includes at least one of a text message, email photos, videos, calendar events, user-installed icon, and a contact.

3. The system of claim 1, wherein execution of the programming by the processor configures the system to perform further functions to update store-specific content on the mobile device after store hours with predetermined content including at least one of a text message, email photos, videos, calendar events, and a contact.

4. The system of claim 1, wherein the tracking report includes a mobile equipment identifier (MEID) for the mobile device and a store identification.

5. The system of claim 1, wherein execution of the programming by the processor configures the system to perform further functions to send the tracking report to the content server at a specified time.

6. The system of claim 1, wherein execution of the programming by the processor configures the system to perform at least one of: configure the preloaded demonstration application or deliver store-specific content based on the tracking report.

7. The system of claim 1, wherein execution of the programming by the processor configures the system to perform further functions to deliver the preloaded demonstration application to the mobile device after store hours.

8. The system of claim 1, wherein execution of the programming by the processor configures the system to perform further functions to deliver different store-specific content to separate preloaded demonstration applications running on separate mobile devices in different geographical locations.

9. The system of claim 1, wherein execution of the programming by the processor configures the system to perform further functions to configure separate preloaded demonstration applications, running on separate mobile devices in different geographical location, to present different store-specific content based on geographic location.

10. The system of claim 1, further including a content management application accessible through a user interface device and configured to allow an administrator to manage content to be delivered to the preloaded demonstration application running on the mobile device.

11. The system of claim 10, wherein the content management application is further configured to allow an administrator to manage the configuration of the preloaded demonstration application running on the mobile device.

12. The system of claim 1, wherein execution of the programming by the processor configures the system to perform further functions to correlate which store the mobile device is located in using a mobile equipment identifier (MEID) for the mobile device and a store identification (ID).

13. The system of claim 1, wherein execution of the programming by the processor configures the system to perform further functions to provide store-specific content to the mobile device dependent on the type of mobile device such that different types of mobile devices at the same store are able to present different store-specific content.

14. The system of claim 1, wherein execution of the programming by the processor configures the system to perform further functions to repopulate the mobile device with predetermined content including at least one of a text message, an email photo, a calendar and a contact.

15. A method, comprising steps of:
    establishing, by a processor, a communication session between a mobile device and a content server;
    delivering store-specific content from the content server to a preloaded demonstration application running on the mobile device;
    removing content added by a user;
    configuring the preloaded demonstration application to present store-specific content to a user through a display device of the mobile device;
    gathering data as a result of use of features of the mobile device and use of applications on the mobile device;

generating a tracking report based on the data gathered from the use of the features and the applications on the mobile device;

determining whether the mobile device is in a predetermined store using a mobile equipment identifier for the mobile device, a store identification associated with the predetermined store in which the mobile device is intended to be located, and global positioning system coordinates of the mobile device;

in response to a determination that the global positioning system coordinates of the predetermined store in which the mobile device is intended to be located are different from the global positioning system coordinates of the mobile device, replacing the store identification associated with the predetermined store in which the mobile device is intended to be located with a store identification associated with a store at the global positioning system coordinates of the mobile device; and updating store-specific content or a configuration of the preloaded demonstration application on the mobile device based on information included in the tracking report and the replaced store identification.

16. The method of claim 15, further comprising a step of: removing the content added by a user after store hours, wherein the removed content includes at least one of a text message, email photos, videos, calendar events, user-installed icon and a contact.

17. The method of claim 15, further comprising a step of: updating content on the mobile device.

18. The method of claim 15, further comprising a step of: sending the tracking report to the content server.

19. The method of claim 15, further comprising a step of: sending the tracking report to a database in communication with the content server.

20. The method of claim 15, further comprising a step of: repopulating the mobile device with predetermined content including at least one of a text message, an email photo, a calendar and a contact.

* * * * *